United States Patent [19]

Herold et al.

[11] Patent Number: 4,981,943

[45] Date of Patent: Jan. 1, 1991

[54] FILM OF AROMATIC COPOLYAMIDE FROM BIS(AMINOPHENOXY) BENZENE

[75] Inventors: Friedrich Herold; Günther Keil, both of Hofheim am Taunus; Werner Bruckner; Jutta Cardinal, both of Kriftel; Cynthia Bennett, Wiesbaden, all of Fed. Rep. of Germany

[73] Assignee: Hoechst Aktiengesellschaft, Frankfurt am Main, Fed. Rep. of Germany

[21] Appl. No.: 231,214

[22] Filed: Aug. 11, 1988

[30] Foreign Application Priority Data

Aug. 14, 1987 [DE] Fed. Rep. of Germany ....... 3727097

[51] Int. Cl.$^5$ ............................................... C08G 69/32
[52] U.S. Cl. .................................. 528/185; 428/474.4; 428/901; 528/191; 528/340; 528/348
[58] Field of Search ................ 528/185, 191, 340, 348

[56] References Cited

U.S. PATENT DOCUMENTS 4,278,786  7/1981  Nanaumi et al. .................... 528/185

FOREIGN PATENT DOCUMENTS 3165515  7/1988  Japan .................................. 528/185

*Primary Examiner*—Harold D. Anderson

[57] ABSTRACT

A film made from aromatic copolyamides of the dicarboxylic acid diamine type, whose shaping substance comprises certain recurring structural units and which has specific criteria regarding Staudinger index, tear strength, volume resistance, electrical dielectric strength, dimensional stability and water absorption, a process for its production, and the use of the film for the production of heat-resistant insulation material or as a substrate for flexible circuit boards.

13 Claims, 1 Drawing Sheet

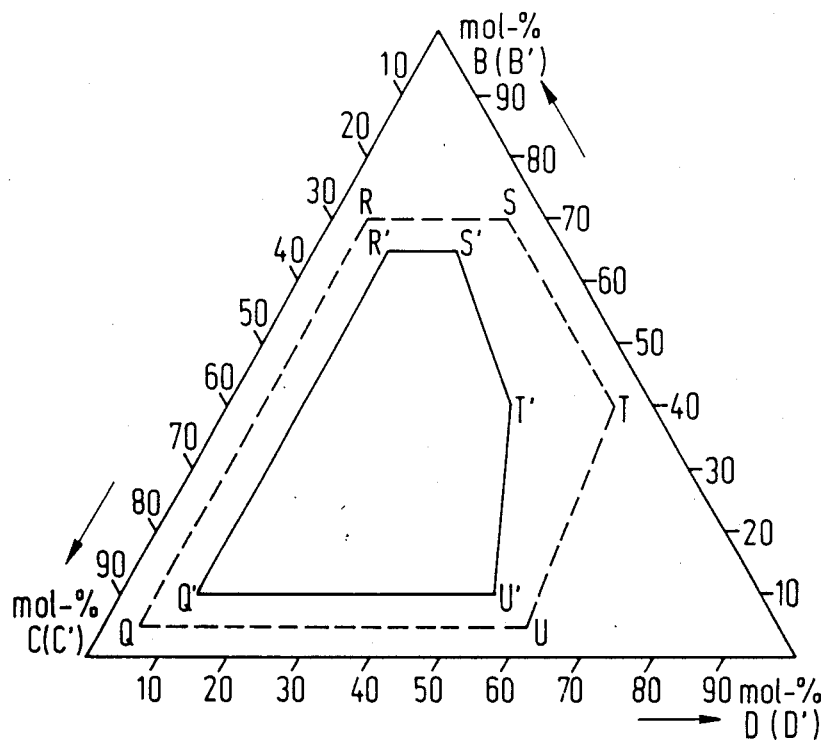

FILM OF AROMATIC COPOLYAMIDE FROM BIS(AMINOPHENOXY) BENZENE

The invention relates to films made from aromatic copolyamides of the dicarboxylic acid diamine type, and to a process for their production. In particular, films can be obtained by means of this invention which, on the one hand have good mechanical properties, even in the unstretched state, and, on the other hand, adopt extremely high values on stretching at relatively low temperatures and are distinguished by low water absorption and extremely high dimensional and UV stability. In addition, the property profile and the maximum concentrations which can be processed can be matched specifically to the particular applications which are possible by modifying the copolymer composition.

Aromatic polyamides are known for their excellent thermal and mechanical properties.

Although films made from predominantly p-linked homopolymers such as poly(p-phenylene) terephthalamide (PPTA) exhibit very good mechanical properties, they must, however, be processed from concentrated sulfuric acid in a two-step process with a reprecipitation step. Problems with corrosion and waste disposal are therefore regarded as disadvantageous (U.S. Pat. No. 3,869,429).

Although films made from more readily soluble, predominantly m-linked homopolymers such as poly(m-phenylene isophthalamide) can be processed from organic solvents, they only achieve good mechanical properties, however, after 2- to 3-fold stretching. The inadequate electrical properties (for example dielectric strength), the worse dimensional stability on warming and the excessive water absorption are also disadvantageous in films made from these types of polymer, in particular in view of the better properties of films made from polyimides (EP-B-0,011,785 and EP-A-0,091,778).

Dielectric strengths of up to 290 kV/mm and thermal shrinkage of 2.3% up to 300° C. accompanied by somewhat lower mechanical values can be achieved by crosslinking and stretching (EP-B-0,007,114).

One way of improving the film properties is offered by copolymers based on PPTA, the processibility in organic solvents being obtained inter alia, by introducing flexible groups (EP-B-0,045,934). Here, copolymers made from 3,4'-diaminodiphenyl ether (3,4'-ODA), p-phenylenediamine (PPD) or 2-chloro-p-phenylenediamine and terephthalyl dichloride (TPC) are described, from which films of high modulus can be produced by stretching. It is disadvantageous that 3,4'-ODA can only be produced via a complex process.

Copolymers made from 3,4'-ODA, PPD or m-phenylenediamine and TPC whose stretched films exhibit comparable properties are also known (German Pat. No. 3,007,063). According to German Pat. No. 2,556,883, even higher values can be achieved after 7.7-fold stretching from 3,4'-ODA or PPD and TPC. However, disadvantages in both publications are, on the one hand, the high stretching ratios which are necessary, for example in the production of biaxially stretched films, the very small elongation at break and the tear strength, which is relatively low compared with the modulus, and, on the other hand, the fact that the amines required for the preparation can only be prepared and purified in very complex processes.

There was therefore a demand that improved films be obtained from an aromatic copolyamide and that the process for their production be carried out as simply as possible from an organic solvent. An important aim of the invention is that even the unstretched, isotropic films exhibit good mechanical and electrical properties with relatively low water absorption. Further aims are a greater UV stability and greater dimensional stability on warming than known films, for example polyimide films, for example Kapton H ® from DuPont, which is the market leader in view of its properties. With respect to stretching, the films should, on the one hand, be stretchable at relatively low temperatures and, on the other hand, should achieve extremely good mechanical properties even at small stretching ratios. In addition, the aim is that it should be possible to substantially vary the properties and the maximum concentration which can be processed by means of the copolymer composition and thus matched specifically to the particular applications which are possible.

The composition of aromatic copolyamides of this type, which henceforth fulfil the conditions mentioned in the form of films, is described in EP-A-0,199,090. However, there is no practical example in this publication of how films of this type are obtained and of their surprising properties.

The invention achieves the object as characterized in the patent claims.

The copolyamides comprise the recurring structural units below:

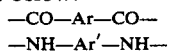  A

—NH—Ar'—NH—  B

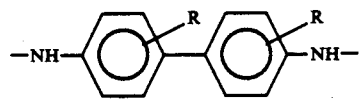  C

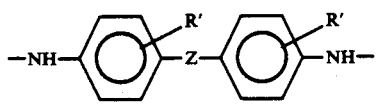  D

—Ar— and —Ar'— are divalent aromatic radicals in which the bonds are in the p- or comparable coaxial or parallel position and which may be substituted by one or two alkyl or alkoxy radicals having up to 4 carbon atoms in the alkyl radical, which radicals may also be branched, or by halogen radicals, preferably chlorine, R and R', independently of one another, are each either hydrogen or up to two alkyl or alkoxy radicals having up to 4 carbon atoms in the alkyl radical, which radicals may also be branched, or halogen radicals, and Z represents an —O—Ar—O— group, where —Ar— has the same structure as mentioned above.

The amounts of the diamines employed cannot be chosen as desired, but only within certain mole-percent ranges, relative to the total molar amount of the diamine components. The concentration range is defined by the corner points Q, R, S, T and U, and the range having the corner points Q', R', S', T' and U' is particularly preferred, cf. the figure.

The Staudinger index [n] of the copolyamides to be molded is in the range 50 to 1200 cm$^3$/g, preferably 200 to 900 cm$^3$/g, measured in 96% strength $H_2SO_4$ at 25° C.

The films are produced from solutions of these copolymers in organic amide solvents, if appropriate with addition of solubilizers. Molding of the films is followed by coagulation, drying and, if appropriate, conditioning.

According to the invention, even the unstretched films achieve tear strengths of at least 14,500 preferably at least 29,000 psi, and moduli of at least 435,000 preferably at least 551,000 psi.

The properties can be substantially varied by modifying the copolymer composition, in particular component D. Thus, for example, the modulus decreases virtually linearly with increasing proportion of D, where B and C can be varied within the range between 9:1 and 1:9 : 10 mol-% of D: 899,000 psi, 12.5 mol-% of D: 856,000 psi, 25 mol-% of D: 725,000 psi, 37.5 mol-% of D: 580,000 psi and 50 mol-% of D: 508,000 psi. However, the maximum concentration which can be processed increases with the loss in modulus on increasing proportion of D, i.e. the production costs are reduced. At the same time, the tear strength of at least 20,000 psi is retained up to 40 mol-% of component D.

With respect to the electrical properties, the films according to the invention exhibit a volume resistance of at least $10^{15}\Omega.cm$ and a dielectric strength of at least 150 kV/mm, preferably at least 200 kV/mm and in particular at least 220 kV/mm.

Residual tear strengths of at least 50% after 500 hours and at least 25% after 1000 hours on exposure to artificial light in the Xeno test illustrate the good UV stability; with respect to dimensional stability, the change in length of conditioned films up to 400° C. is a maximum of 2%, preferably a maximum of 1.3%.

Suitable stretching methods are contact stretching at temperatures from 200° to 500° C., preferably from 250° to 400° C. and particularly preferably 280° to 350° C., furthermore wet-stretching in the swollen state or combinations of the two methods. The initial tear strengths $T_i$ increase according to the invention to extremely high values due to stretching; in detail, for example in the case of uniaxial stretching, in accordance with equation (1) for the lower limit $T_l$, or equation (2) for the upper limit $T_u$ for the tear strengths achievable $$T_l = (K_1 \times SR) \div T_i \quad (1)$$

$$T_u = (K_2 \times SR) + T_i \quad (2)$$

where T is expressed in psi and SR is expressed as the stretching ratio as a multiple of the initial length. For example, stretching of 200% corresponds to 2-fold stretching, i.e. the value for SR is 2.

In the equations, $K_1$ and $K_2$ adopt values of 36,000 and 123,000, particularly preferably 51,000 and 123,000, respectively. Correspondingly, equations (3) and (4) give the lower limit $M_l$ and the upper limit $M_u$ for the moduli M which can be achieved by stretching, starting from the initial value $M_i$.

$$M_l = (K_3 \times SR) + M_i \quad (3)$$

$$M_u = (K_4 \times SR) + M_i \quad (4)$$

where M is expressed in psi and SR as described above.

In these equations, $K_3$ and $K_4$ adopt values of 435,000 and 2,175,000, particularly preferably 580,000 and 2,175,000, respectively. The pairs of values for the tear strength and elongation at break for stretched films are within the range whose limits are given by equation (5), for the lower limit and equation (6), for the upper limit.

$$T_{max} = 420,000 - (18,390 \times E) + (147.6 \times E^2)$$

where T is expressed in psi and the elongation at break E in %, and the equations (5) and (6) are only valid for $5 < E < 20$.

For example, 2-fold stretched films containing 25 mol-% of D exhibit the mean mechanical properties: T/E/M = 218,000 psi/9%/3,626,000 psi.

Compared with other polyamides, the water absorption of the films according to the invention is low and is, in the unstretched state, a maximum of 3% by weight at 23° C. and 50% relative humidity. Stretching reduces this value, for example to a maximum of 2% at a stretching ratio of 2.5-fold.

The following compounds are suitable for the preparation of the copolyamides required according to the invention and containing the recurring structural units A to D:

The following are suitable examples of dicarboxylic acid derivatives of the formula ti Cl—CO—Ar—CO—Cl:  A'

4,4'-diphenyl sulfone dicarbonyl dichloride,
    4,4'-diphenyl ether dicarbonyl dichloride,
    4,4'-diphenyldicarbonyl dichloride,
    2,6-naphthalenedicarbonyl dichloride, but very particularly
    terephthalyl dichloride and substituted
    terephthalyl dichlorides, such as, for example,
    2-chloroterephthalyl dichloride.

Suitable aromatic diamines of the structure $$H_2N\text{—}Ar'\text{—}NH_2 \quad B'$$

are, in particular, p-phenylenediamine or substituted phenylenediamines, such as, for example, 2-chloro-, 2,5-dichloro- or 2-methoxy-p-phenylenediamine.

Suitable benzidine derivatives of the formula

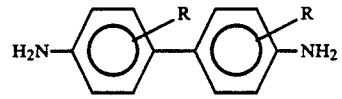 C' are particularly 3,3'-dimethoxy-, 3,3'-dichloro-, 2,2'-dimethyl- and very particularly 3,3'-dimethylbenzidine.

The diamine components of the formula

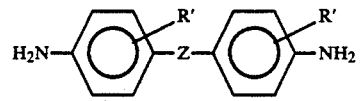 D' are, in particular, 1,4-bis-(4'-aminophenoxy)benzene and the substituted derivatives corresponding to the claim.

Three diamine components are necessary in the invention for formation of the copolyamide, where the amounts of the diamines employed cannot be selected as desired, but only within certain mole-percent ranges, relative to the total molar amount of the diamine components.

The composition range necessary in the invention for the copolymers is defined by the following corner points: the limits of the range are also shown graphically in FIG. 1 in the triangular coordinate system. The corner points of the range claimed have the coordinates shown in Table 1.

TABLE 1

| Definition of the corner points of the ranges (cf. figure) | | | | | | | |
|---|---|---|---|---|---|---|---|
| | mol-% of | | | | mol-% of | | |
| Point | B | C | D | Point | B | C | D |
| Q | 5 | 90 | 5 | Q' | 10 | 80 | 10 |
| R | 70 | 25 | 5 | R' | 65 | 25 | 10 |
| S | 70 | 5 | 25 | S' | 65 | 15 | 20 |
| T | 40 | 5 | 55 | T' | 40 | 20 | 40 |
| U | 5 | 35 | 60 | U' | 10 | 37.5 | 52.5 |

The concentration range is defined by the corner points Q, R, S, T and U, and the preferred range has the corner points Q', R', S', T' and U'. The excellent properties of the films molded according to the invention are based on incorporation of the amine components B', C' and D' within the indicated limits.

The solution condensation of the aromatic dicarbonyl dichlorides with the mixtures of aromatic diamines is carried out in aprotic, polar solvents of the amide type, such as N,N-dimethylacetamide or, in particular, N-methyl-2-pyrrolidone. If appropriate, halide salts of the first and/or second group of the Periodic Table can be added to these solvents in a known manner in order to increase the dissolving power or to stabilize the polyamide solutions. Preferred additives are calcium chloride and/or lithium chloride. The amount of dicarbonyl dichloride is usually selected so that the solution viscosity is maximized, i.e. slightly more or less than 100 mol-% is added depending on the monomer purity.

The polycondensation temperatures are usually between $-20°$ and $+120°$ C., preferably between $+10°$ and $+100°$ C. Particularly good results are achieved at reaction temperatures between $+10°$ and $+80°$ C. The polycondensation reactions are preferably carried out in a manner such that 2 to 15, preferably 3.5 to 10, % by weight of polycondensate are present in the solution when the reaction is complete. Increasing the proportion of component D' enables processing at relatively high concentrations, whereas the polymer concentration in the solution must be significantly reduced in the case of small proportions of D'. The upper limit for the proportion of D' is from about 60 mol-% since the properties according to the invention can no longer be achieved here, and the lower limit is at a maximum value of 5 mol-% since inadequate solubility of the polymers is then apparent. For specific applications, the solution may be diluted, if required, with N-methyl-2-pyrrolidone or other amide solvents.

The polycondensation can be terminated in a customary manner, for example by adding monofunctional compounds such as benzoyl chloride, but the use of monofunctional amines in order to limit the molecular weight is just as suitable.

When polycondensation is complete, i.e. when the polymer solution has achieved the viscosity necessary for further processing, the hydrogen chloride produced, which is bound loosely to the amide solvent, can be neutralized by adding basic substances. Lithium hydroxide, calcium hydroxide, but in particular calcium oxide, for example, are suitable for this purpose. In order to produce molded structures in accordance with the present invention the polyamide solutions described above are filtered, degassed and further processed to films in a known manner.

It is also possible to add suitable amounts of customary additives to the solutions. Examples are light stabilizers, antioxidants, antistatic agents, dyes, colored pigments or fillers.

Known processes such as casting or extrusion are used to mold the films: in the case of casting, the filtered and degassed solution is applied in thin layers onto substrate materials. Suitable substrate materials are inert polymer films, for example made of polyester, or metal tapes, or, on a laboratory scale, alternatively glass plates. The solutions are preferably processed at temperatures at least about 10° C. below the boiling point of the solvent used, particularly preferably at least about 30° C. below the boiling point. If the temperatures are too high, the danger exists of depolymerization occurring, whereas processing becomes difficult if the temperatures are too low due to the high viscosities. Pre-drying of the cast films, in general to a residual solvent content in the film of between 5 and 90%, is favorable, but not necessary. Suitable conditions are temperatures between room temperature and about 10° C. below the boiling point of the solvent used, also in combination with strong convection, as prevails, for example, in circulation cabinets. Depending on the temperature and convection, times from a few minutes to days, preferably 2 to 30 minutes, are sufficient. The films can be detached from the substrate material immediately or during or immediately after coagulation. As an alternative to casting, the filtered and degassed solutions can also be coagulated directly through appropriate nozzles. In this case, wet or dry/wet methods are applicable; the former involves direct coagulation, and in the latter the pre-shaped film initially passes through a zone containing a non-coagulating medium, for example air. This zone can be between 5 and 400 mm, preferably between 10 and 100 mm.

Coagulation baths which can be used are water, organic solvents or mixtures thereof, in each case, if required, with salt additives. Suitable salt additives are, for example, the abovementioned halide salts of the first and second groups of the Periodic Table. The preferred salt is the one which is also used as solubilizer in the preparation of the condensation solution; $CaCl_2$ is particularly preferred, it being possible to vary the concentration within broad limits. The temperature should be about 10° C. lower than the boiling point of the coagulation bath, preferably between room temperature and 90° C.

The coagulated films are subsequently washed, for example they can be passed over rolls through several consecutive wash baths. The prerequisite for achieving the desired electrical properties is that the salt is washed out as completely as possible. Aqueous baths, whose temperatures should generally be between room temperature and 90° C., preferably up to 70° C., are preferred for this purpose. Depending on the number of baths and the circulation of the medium (countercurrent), the washing process can take 5 minutes up to several days; 5-30 minutes are preferred.

Drying preferably takes place over rolls or by means of IR lamps at temperatures between 100° and 500° C. It is favorable, but not necessary here to work with temperature gradients and/or under nitrogen. Final temperatures of 300°-400° C., which permit short times and make a separate conditioning step superfluous, are particularly favorable for processing.

A conditioning step at temperatures between 200° and 500° C., preferably 300°-400° C., is preferably carried out in order to achieve the excellent dimensional stability up to 400° C. according to the invention. It is favorable to condition the films under load, but the operation can likewise be carried out under a nitrogen atmosphere. The maximum load force here must not be more than the tear strength of the films at the particular temperature, but the film is preferably not loaded with more than 10% of this limiting value. A separate conditioning step is likewise superfluous in the production of stretched films.

Known methods can be used for uniaxial or biaxial stretching, the latter either consecutively or simultaneously: besides stretching dry films over hot surfaces, under IR lamps or other heat sources, it is also possible to stretch films while wet with a residual content of solvent and/or salt, also in solvent baths. In the case of stretching dry films, an advantage is that high specific values with respect to the properties are obtained even at the relatively low minimum temperatures necessary of 200, preferably 250° C. Here too, stretching can be effected under a nitrogen atmosphere. It is also possible to combine wet and dry stretching. The stretching ratios are in the range 1.5 to 20 fold, preferably 2–10 fold (uniaxial). According to the invention, even low stretching ratios are sufficient to achieve extraordinarily good mechanical properties.

The films according to the invention are used industrially, for example as heat resistant insulation material and as the substrate for flexible circuit boards, for example in the area of data processing. In particular, suitable areas of application are those which require a combination of good mechanical properties, temperature stability and dimensional stability, which are achieved here, according to the invention, even in the unstretched, and thus isotropic, form.

The property values indicated were determined by the following test methods:

Staudinger index $[\eta]$: The Staudinger index $[\eta]$ is defined by equation (7):

$$[\eta] = \lim_{c_2 \to 0} \frac{(\eta/\eta_1) - 1}{c_2} \quad (7)$$

where $\eta$ and $\eta_1$ denote the viscosities of the solution and solvent and $c_2$ denotes the concentration of the polymer.

Viscosity $\eta$: The viscosity n was determined using a rotation viscosimeter (type RV 100, Messrs. Haake, Karlsruhe); the value indicated is that for the condensation solution at 90° C. extrapolated to a shear gradient of zero.

Mechanical properties of the films: The measurement was carried out using an Instron tensile strength instrument (test conditions: strip width 15 mm, clamped length 50 mm and measurement speed 20 mm/min). The tear strength, elongation at break, initial modulus (up to 0.5% elongation), all in accordance with DIN 53455 (Test specimen 5)) and tear propagation strength (in accordance with DIN 53859 (part 2)) were determined at 23° C. and a relative atmospheric humidity of 50%, in each case as the mean of several measurements.

Dimensional stability: The dimensional stability was measured using a TA-3000 system with TMA-40 measuring head (Messrs. Mettler Greifensee, Switzerland), with which the change in length of a film sample on warming under nitrogen is determined. In this test, the expansion of the clamps must be taken into account due to the high dimensional stability to above 400° C. of the high temperature-stable films investigated.

Electrical measurements: All values were determined at 23° C. and a relative atmospheric humidity of 50%, in each case by means of four to six individual measurements. In detail, the following conditions applied:

Dielectric constant, loss factor: in accordance with DIN 53483 using vapor-deposited Al electrodes (4.5 cm$^2$) at a frequency of 1000 s$^{-1}$ (kilohertz)

Resistance: in accordance with DIN 53482

Dielectric strength: in accordance with DIN 53481 at a frequency of 50 s$^{-1}$ (hertz)

Xenotest (DIN 51187/cycle B): The UV stability was determined by means of measurements with a Xenotest 450 instrument under alternating weather conditions (17 minutes dry, 3 minutes rain) at a black panel temperature of 45° C. and a relative atmospheric humidity of 80%.

Thermal measurements: The thermal data, such as melting and decomposition point, are determined by the methods of thermogravimetric analysis (TGA: N$_2$, 3 K/min) and differential thermoanalysis (DSC: N$_2$, 10 K/min).

In the examples below, % denotes percent by weight, unless otherwise stated and with the exception of the data for elongation at break, change in length, residual tear strength and residual initial modulus.

EXAMPLES

The proportions of the dicarboxylic acid and diamine components have in each case been set at 100 mol-%, and the following abbreviations apply:

BAPOB: 1,4-bis-(4'-aminophenoxy)benzene
Cl-PPD: 2,5-dichloro-p-phenylenediamine
DAPM: 4,4'-diaminodiphenylmethane
2-DMB: 2,2'-dimethylbenzidine
3-DMB: 3,3'-dimethylbenzidine
DMOB: 3,3'-dimethoxybenzidine
NMP: N-methyl-2-pyrrolidone
PPD: p-phenylenediamine
TMB: 3,5,3',5'-tetramethylbenzidine
TPC: terephthalyl dichloride (1) Films made from aromatic copolyamide, comprising 100 mol-% of TPC, 25 mol-% of BAPOB, 25 mol-% of PPD and 50 mol-% of 3-DMB.

10.82 g of PPD, 42.46 g of 3-DMB and 29.24 g of BAPOB were dissolved under a nitrogen atmosphere in 2503 g of NMP, and 81.21 g of TPC were added over the course of 60 minutes at a temperature between 15° and 70° C. The viscous, clear solution was stirred for approximately 40 minutes more at 70° C. and then neutralized using 24.54 g of CaO (96% purity), i.e. in 5% excess, and stirred at 70° C. for a further 30 minutes.

The solution contained 5.0% of copolyamide and 1.7% of CaCl$_2$; the dissolved polyamide exhibits a Staudinger index of 500 cm$^3$/g and a viscosity of 1110 poise at 90° C.

The solution was filtered, degassed and cast to form films by sheeting out onto glass plates at 90° C. using a doctor blade. The cast films were subsequently predried for 48 hours at 90° C., then coagulated in water at 25° C., subsequently washed for 20 minutes in running water and for 24 hours in demineralized water and then dried for 48 hours at 110° C. and 50 mbar under a gentle stream of nitrogen.

Depending on the coating thickness of the solution applied by doctor blade, the thickness of the films could be set between 2 and 100 μm.

The mechanical properties of an unstretched 25 μm film were: 33,000 psi tear strength, 80% elongation at break, 725,000 psi initial modulus and a tear propagation strength of 13 g. At 200° C., the tear strength was still 14,000 psi and the elongation at break 115%.

The electrical properties of the films at 23° C. and a relative atmospheric humidity of 50% gave the following values: dielectric strength 240 kV/mm, dielectric constant 4.6, loss factor $2.5 \times 10^2$, volume resistance $10^{16}$ Ω.cm and surface resistance $10^{14}$ Ω. The water absorption is 2.5%.

Investigation of the thermal properties of the films showed a melting peak from 440° C., which immediately changed into decomposition from 460° C. With respect to the dimensional stability, a change in length of less than 0.8% was apparent up to 200° C.

(2) The films obtained from an aromatic copolyamide in corresponding manner to Example 1 were conditioned at 350° C. under a load of 73 psi.

The films obtained exhibit a clearly improved dimensional stability at temperatures above 250° C.; up to 400° C., the change in length remains at values less than 1.1%.

(3) The films obtained from an aromatic copolyamide in a corresponding manner to Example 1 were subsequently stretched 1.5 fold at 280° C. in an Instron tensile strength instrument with heat chamber.

The mechanical properties increase to 116,000 psi tear strength, 2,756,000 psi initial modulus and 12% elongation at break.

(4) The films obtained from an aromatic copolyamide in a corresponding manner to Example 1 were subsequently stretched 2.5 fold at 280° C. in an Instron tensile strength instrument with thermal chamber.

The mechanical properties increase to 218,000 psi tear strength, 3,626,000 psi initial modulus and 9% elongation at break.

The water absorption of the films stretched in this manner is 1.8% at 23° C. and a relative atmospheric humidity of 50%.

(5) The light stability of films made from an aromatic copolyamide in corresponding manner to Example 1 was investigated in the Xeno test.

Starting from mechanical properties of the films corresponding to 32,000 psi tear strength, 71% elongation at break and 667,000 psi initial modulus, the tear strength was 71%, the residual initial modulus was 111% and the residual elongation at break was 39% after 500 hours, and the residual tear strength was 31%, the residual initial modulus was 72% and the elongation at break was 2% after 1000 hours.

COMPARISON EXAMPLE V1

For comparison, a polyimide film made from pyromellitic dianhydride and 4,4'-diaminodiphenyl ether of thickness 25 μm, which is commercially available from Messrs. DuPont (USA) as Kapton H ® and has the best property values of the prior art, was investigated.

Starting from mechanical properties of the films corresponding to 26,000 psi tear strength, 30% elongation at break and 435,000 psi initial modulus, the residual tear strength was 22%, the residual initial modulus was 93% and the elongation at break was 2% after 500 hours, and the film had already been destroyed after 1000 hours. Measurements of the dimensional stability gave a change in length of less than 1.4% up to 200° C. and a change in length of less than 1.8% up to 400° C.

The value for the tear propagation strength was 5 g. 6–18 and

COMPARISON EXAMPLES V2–V4

Examples 6 to 18 show the possibility according to the invention of substantially varying the mechanical properties and the maximum concentration which can be processed by modifying the composition of the copolymers. In addition, Comparison Examples V2 to V4, indicated by the prefix V, which describe experiments using diamines which differ from the invention or experiments outside the range claimed, are listed.

The films were in all cases produced analogously to Example 1; the corresponding data are summarized by Tables 1 and 2, in which the composition of the copolymers, the concentrations of polymer and $CaCl_2$, the Staudinger index [η], the viscosity η at 90° C. and the film properties of 25 μm films are given. If necessary, LiCl was added to produce a homogeneous solution.

19 and 20

Films made from aromatic copolyamide, comprising 100 mol-% of TPC, 12.5 mol-% of BAPOB, 37.5 mol-% of PPD and 50 mol-% of 3-DMB.

14.60 g of PPD, 38.21 g of 3-DMB and 13.16 g of BAPOB were condensed and neutralized as in Example 1, but, in Example 20, quenched using 1.7 g of benzoyl chloride before the maximum viscosity was reached.

The solutions contained 4.1% of copolyamide and 1.5% of $CaCl_2$.

The solutions were filtered, degassed and processed to films as in Example 1, but, different to Example 1, coagulated at 60° C. in a water/NMP mixture (65:35).

The corresponding data, such as Staudinger index [η], viscosity η at 90° C. and the mechanical properties of the films are reproduced in Table 3.

TABLE 1

| Example No. | A Name | mol-% | g | B Name | mol-% | g | C Name | mol-% | g | D Name | mol-% | g |
|---|---|---|---|---|---|---|---|---|---|---|---|---|
| 6 | TPC | 100 | 60.91 | PPD | 10 | 3.24 | 3-DMB | 80 | 50.95 | BAPOB | 10 | 8.77 |
| 7 | TPC | 100 | 52.63 | PPD | 37.5 | 10.51 | 3-DMB | 50 | 27.51 | BAPOB | 12.5 | 9.47 |
| 8 | TPC | 100 | 81.21 | PPD | 17.5 | 7.57 | 3-DMB | 60 | 59.95 | BAPOB | 22.5 | 26.31 |
| 9 | TPC | 100 | 60.91 | PPD | 40 | 12.98 | DMOB | 35 | 25.65 | BAPOB | 25 | 21.93 |
| V2 | TPC | 100 | 60.91 | PPD | 45 | 14.60 | 3-DMB | 20 | 12.74 | DAPM | 35 | 20.82 |
| 10 | TPC | 100 | 60.91 | PPD | 60 | 19.47 | 3-DMB | 25 | 15.92 | BAPOB | 15 | 13.16 |
| V3 | TPC | 100 | 60.91 | PPD | 80 | 25.95 | 3-DMB | 10 | 6.37 | BAPOB | 10 | 8.77 |
| 11 | TPC | 100 | 20.30 | PPD | 37.5 | 4.06 | TMB | 50 | 12.02 | BAPOB | 12.5 | 3.66 |
| 12 | TPC | 100 | 81.21 | PPD | 40 | 17.30 | 3-DMB | 30 | 25.47 | BAPOB | 30 | 35.08 |
| 13 | TPC | 100 | 60.91 | Cl-PPD | 33.3 | 17.70 | 3-DMB | 33,3 | 21.23 | BAPOB | 33.3 | 29.23 |
| 14 | TPC | 100 | 60.91 | PPD | 25 | 8.11 | 3-DMB | 37,5 | 23.88 | BAPOB | 37.5 | 32.89 |
| 15 | TPC | 100 | 81.21 | PPD | 25 | 10.82 | 2-DMB | 37,5 | 31.84 | BAPOB | 37.5 | 43.85 |
| 16 | TPC | 100 | 81.21 | PPD | 10 | 4.33 | 3-DMB | 45 | 38.21 | BAPOB | 45 | 52.62 |

TABLE 1-continued

| Example No. | Name | A mol-% | g | Name | B mol-% | g | Name | C mol-% | g | Name | D mol-% | g |
|---|---|---|---|---|---|---|---|---|---|---|---|---|
| 17 | TPC | 100 | 60.91 | PPD | 45 | 14.60 | 3-DMB | 10 | 6.37 | BAPOB | 45 | 39.47 |
| 18 | TPC | 100 | 81.21 | PPD | 25 | 10.81 | 3-DMB | 25 | 21.23 | BAPOB | 50 | 58.47 |
| V4 | TPC | 100 | 60.91 | PPD | 10 | 3.24 | 3-DMB | 10 | 25.47 | BAPOB | 80 | 43.85 |

(21) Films made from a mixture of the copolyamides from Example 19 (60%) and Example 20 (40%).

The corresponding data as in Examples 19 and 20 are likewise summarized in Table 3.

TABLE 3

|  | Example No. | | |
|---|---|---|---|
|  | 19 | 20 | 21 |
| Characterization | | | |
| [η]/(cm³/g) | 805 | 490 | 620 |
| η/poise | 2,500 | 150 | 950 |
| Film properties | | | |
| Tear strength/psi | 26,000 | 27,000 | 28,000 |
| Elongation at break/% | 43 | 41 | 33 |
| Initial modulus/psi | 696,000 | 740,000 | 798,000 |

(22) Films made from an aromatic copolyamide, corresponding to Example 1, wet-stretched.

The filtered and degassed solution was cast to form films and treated in a corresponding manner to Example 1, but, after a brief pre-drying time of 3 hours at 90° C., with wet stretching in the swollen state. Stretching was effected in a water/NMP mixture (50:50) at 90° C., and the stretching ratio was 1.5 fold.

The mechanical properties of the film were 116,000 psi tear strength, 13% elongation at break and 2,321,000 psi initial modulus.

We claim:

1. A film of a aromatic copolyamide comprises the recurring structural units of the formulae A, B, C, D A —CO—Ar—CO—
B —NH—Ar'—NH—

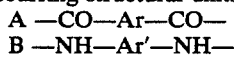

C

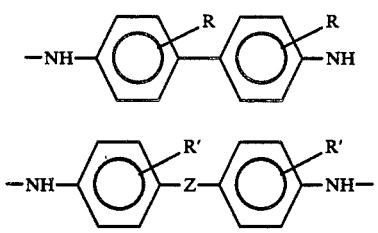

D where
—AR— and —Ar'— are each a divalent aromatic radical in which the bonds are in the p- or comparable coaxial or parallel position and are unsubstituted or substituted by one or two alkyl or alkoxy radicals having up to 4 carbon atoms or by at least one halogen radical, R and R', independently of one another, each denotes either hydrogen, alkyl or alkoxy radicals having up to 4 carbon atoms in the alkyl radical, or halogen radicals, and Z is an —O—Ar—O— group, where —Ar— is defined above, and the proportions of the diamino moieties B, C and D are within the mole-percent range, relative to the total molar amount of the B+C+D diamino moieties components, which is formed by the corner points Q, R, S, T and U, where

| Point Q: | 5 mol-% of B | 90 mol-% of C | 5 mol-% of D |
| Point R: | 70 mol-% of B | 25 mol-% of C | 5 mol-% of D |
| Point S: | 70 mol-% of B | 5 mol-% of C | 25 mol-% of D |
| Point T: | 40 mol-% of B | 5 mol-% of C | 55 mol-% of D |
| Point U: | 5 mol-% of B | 35 mol-% of C | 60 mol-% of D | which film is unstretched or stretched and has the following specific criteria (a) to (e):

(a) the Staudinger index [η] is in the range 50 to 1200 cm³/g, measured in 96% strength $H_2SO_4$ at 25° C.;

(b) the tear strength is at least 14,500 psi and the modulus is at least 435,000 psi;

(c) the volume resistance is at least $10^{15}$ Ω.cm and the electrical dielectric strength is at least 150 kV/mm at 23° C. and at a frequency of 50 $s^{-1}$;

(d) the dimensional stability has a maximum change in length of 2%, and (e) the maximum water absorption of the film is 3% by weight at 23° C. and a relative atmospheric humidity of 50%.

2. A film as claimed in claim 1, wherein the film is stretched.

3. A film as claimed in claim 1, which is uniaxially stretched and has tear strengths in accordance with the equations $$T_l = (K_1 \times SR) + T_i \quad (1)$$

and $$T_u = (K_2 \times SR) + T_i \quad (2),$$

where the constants $K_1$ and $K_2$ have values of 36,000 and 123,000 respectively and $T_i$ is the initial tear strength, $T_l$ is the lower limit and $T_u$ the upper limit for the tear strength values in psi which are achievable, and SR is the stretching ratio as a multiple of the initial length, and has modulus values in accordance with the equations $$M_l = (K_3 \times SR) + M_i \quad (3)$$

and $$M_u = (K_4 \times SR) + M_i \quad (4),$$

where the constants $K_3$ and $K_4$ have values of 435,000 and 2,175,000 respectively, and $M_i$ is the initial modulus, $M_l$ is the lower limit and $M_u$ the upper limit for the moduli in psi which can be achieved by stretching, and SR has the above definition.

4. A film as claimed in claim 3, wherein the pairs of values for tear strength in psi and elongation at break in % are within a range given by the equations $$T_{min} = 187,000 - (7,653 \times E) + (60.75 \times E^2) \quad (5)$$

and $$T_{max} = 420,000 - (18,390 \times E) + (147.6 \times E^2), \quad (6)$$

where (5) relates to the lower and (6) to the upper limit and (5) and (6) are subject to the requirement that $5 < E < 20$.

5. A film as claimed in claim 3, wherein $K_1$ in equation (1) is the number 36,000 and $K_3$ in equation (3) is the number 580,000.

6. A film as claimed in claim 1, wherein the Staudinger index is in the range 200 to 900 cm$^3$/g, measured in 96% strength $H_2SO_4$ at 25° C.

7. A film as claimed in claim 1, wherein, in the unstretched and isotropic state, the tear strength is at least 29,000 psi and the modulus is at least 551,000 psi.

8. A film as claimed in claim 1, wherein the electrical dielectric strength is at least 200 kv/mm at 23° C. and at a frequency of 50 s$^{-1}$.

9. A film as claimed in claim 1, wherein the change in length of an unconditioned film exhibits maximum values of 0.8%, up to 200° C. and the change in length of a conditioned film exhibits maximum values of 1.3% up to 400° C.

10. A film as claimed in claim 1, wherein the -Ar- and -Ar'- radicals are unsubstituted or substituted by one or two alkyl or alkoxy radicals having up to 4 carbon atoms in the alkyl radical, or by halogen radicals.

11. Flexible, board-like heat-resistant insulation material comprising the film as claimed in claim 1.

12. A flexible circuit board comprising the flexible, board-like heat-resistant insulation material of claim 11 as a substrate for data processing circuitry.

13. The film as claimed in claim 10, wherein the halogen is chlorine.

* * * * *

UNITED STATES PATENT AND TRADEMARK OFFICE
CERTIFICATE OF CORRECTION

PATENT NO. : 4,981,943
DATED : January 1, 1991
INVENTOR(S) : HEROLD ET AL.

It is certified that error appears in the above-identified patent and that said Letters Patent is hereby corrected as shown below:

In col. 2, line 62
   "n" should read --$\eta$--.

In col. 3, line 18
   "20,000" should read --29,000--.

In col. 3, line 27
   "Xeno test" should read --Xenotest--.

In col. 3, line 41
   "T1 = ($K_1$ X SR) $\div$ Ti" should read --T1 = ($K_1$ X SR) + Ti--.

In col. 3, line 66 please insert after "limit,":
   --Tmin = 187,000 - (7653 X E) + (60.75 X $E^2$).          (5)--.

In col. 3, line 67 please identify equation for Tmax as Equation 6.

In col. 4, line 19 please delete "ti".

In col. 7, line 48
   "n" should read --$\eta$--.

In col. 9, line 43
   "Xeno test" should read --Xenotest--.

In col. 10, line 31
   "Tables 1 and 2" should read --Tables 2 and 3--.

UNITED STATES PATENT AND TRADEMARK OFFICE
CERTIFICATE OF CORRECTION

PATENT NO. : 4,981,943

DATED : January 1, 1991

INVENTOR(S) : HEROLD ET AL.

It is certified that error appears in the above-identified patent and that said Letters Patent is hereby corrected as shown below:

In col. 10, line 52
  "Table 3" should read --Table 4--.

In col. 10, line 54
  "TABLE 1" should read --TABLE 2--.

In col. 11, line 1
  "TABLE 1" should read --TABLE 2--.

In col. 11, line 9

Insert (see attached sheets)

UNITED STATES PATENT AND TRADEMARK OFFICE
CERTIFICATE OF CORRECTION

PATENT NO. : 4,981,943
DATED : January 1, 1991
INVENTOR(S) : HEROLD ET AL.

It is certified that error appears in the above-identified patent and that said Letters Patent is hereby corrected as shown below:

--TABLE 3

| Example No. | Concentration | | | Characterization | |
|---|---|---|---|---|---|
| | % Polymer | %$CaCl_2$ | % LiCl | $[\eta]/cm^3/g)$ | $\eta$/Poise |
| 6 | 2.4 | 0.7 | 1.2 | 635 | 2030 |
| 7 | 3.5 | 1.3 | - | 875 | 2270 |
| 8 | 5.0 | 1.7 | - | 675 | 4600 |
| 9 | 4.0 | 1.4 | - | 775 | 1580 |
| V2 | 4.0 | 1.6 | - | 500 | 560 |
| 10 | 2.7 | 1.1 | 0.3 | 445 | 1360 |
| V3 | 3.0 | 1.3 | 1.1 | 175 | 710 |
| 11 | 4.0 | 1.4 | - | 395 | 650 |
| 12 | 5.0 | 1.8 | - | 435 | 650 |
| 13 | 4.0 | 1.3 | - | 435 | 100 |
| 14 | 5.5 | 1.9 | - | 615 | 3320 |
| 15 | 5.5 | 1.9 | - | 440 | 1450 |
| 16 | 6.0 | 1.9 | - | 425 | 1440 |
| 17 | 5.0 | 1.8 | - | 460 | 1130 |
| 18 | 6.0 | 2.0 | - | 375 | 580 |
| V4 | 5.5 | 1.7 | - | 320 | 140 |

UNITED STATES PATENT AND TRADEMARK OFFICE
CERTIFICATE OF CORRECTION

PATENT NO. : 4,981,943
DATED : January 1, 1991
INVENTOR(S) : HEROLD ET AL.

It is certified that error appears in the above-identified patent and that said Letters Patent is hereby corrected as shown below:

Table 3 Cont'd.

| Example No. | Film Properties | | |
|---|---|---|---|
| | Tear Strength (psi) | Elongation At Break (%) | Initial Modulus (psi) |
| 6 | 41,000 | 43 | 899,000 |
| 7 | 57,000 | 90 | 856,000 |
| 8 | 37,000 | 65 | 812,000 |
| 9 | 18,000 | 20 | 638,000 |
| V2 | 19,000 | 22 | 595,000 |
| 10 | 27,000 | 25 | 812,000 |
| V3 | 10,000 | 24 | 305,000 |
| 11 | 21,000 | 10 | 870,000 |
| 12 | 23,000 | 30 | 682,000 |
| 13 | 32,000 | 55 | 638,000 |
| 14 | 31,000 | 86 | 566,000 |
| 15 | 33,000 | 73 | 653,000 |
| 16 | 30,000 | 82 | 551,000 |
| 17 | 26,000 | 109 | 435,000 |
| 18 | 18,000 | 40 | 493,000 |
| V4 | 11,000 | 31 | 319,000 |

UNITED STATES PATENT AND TRADEMARK OFFICE
CERTIFICATE OF CORRECTION

PATENT NO. : 4,981,943
DATED : January 1, 1991
INVENTOR(S) : HEROLD ET AL.

It is certified that error appears in the above-identified patent and that said Letters Patent is hereby corrected as shown below:

In col. 11, line 14
   "Table 3" should read --Table 4--.

In col. 11, line 15
   "TABLE 3" should read --TABLE 4--.

In claim 1, col. 11, line 45
   Formula C should read:

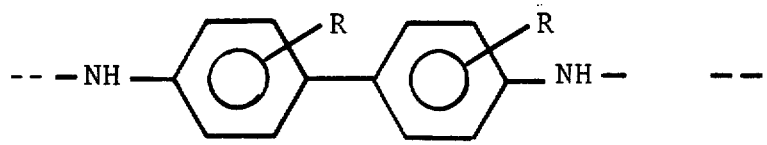

In claim 3, col. 12, line 39
   Equation (1) should read: --$T1 = (K_1 \times SR) + Ti$--.

In claim 5, col. 13, line 6
"36,000" should read --51,000--.

Signed and Sealed this

Twenty-fourth Day of November, 1992

Attest:

DOUGLAS B. COMER

*Attesting Officer*     Acting Commissioner of Patents and Trademarks